United States Patent [19]
Dewolf et al.

[11] Patent Number: 5,240,178
[45] Date of Patent: Aug. 31, 1993

[54] ACTIVE ANTICIPATORY CONTROL

[76] Inventors: Thomas L. Dewolf, 8139 Portobello Way, Liverpool, N.Y. 13090; Thomas R. Phillips, 6108 Gaspe La., Cicero; Ronald W. Bench, 8535 Farmgate Path, both of Cicero, N.Y. 13041

[21] Appl. No.: 755,418

[22] Filed: Sep. 5, 1991

[51] Int. Cl.$^5$ ............................................. G05D 15/00
[52] U.S. Cl. ................................. 236/78 D; 236/68 B; 165/26
[58] Field of Search ............. 236/68 B, 78 D; 165/26; 364/567

[56] References Cited

FOREIGN PATENT DOCUMENTS 60-4408 10/1985 Japan ................... 236/78 D

Primary Examiner—John Sollecito

[57] ABSTRACT

A space temperature control which prevents overshoot and undershoot of a desired space temperature by adjusting a subsequent sensed space temperature as a function of a previous sensed maximum space temperature to deenergize a space conditioning device at the adjusted temperature to maintain the desired space temperature.

4 Claims, 3 Drawing Sheets

ACTIVE ANTICIPATORY CONTROL

BACKGROUND OF THE INVENTION

1. Field of the Invention

This invention relates generally to electronic controls for a heating and air conditioning system and, more particularly, to a control for limiting the amount of overshoot and undershoot in a space conditioning system.

2. Prior Art

In order to keep the temperature within a space to be conditioned at a specified setpoint, a thermostatic control is used to operate the heating and air conditioning system when a temperature sensor indicates a specified difference from a setpoint or desired temperature. However, during the operation of the heating and air conditioning system the actual temperature of space overshoots the desired temperature because of the temperature sensor time constant or lag, and because of the latent heat/cool in the space conditioning system has not yet been transferred to the space when the system is switched off.

Thus, there is a clear need for a control for a space conditioning system that will compensate for the sensor lag and system latent heat during the operation of the space conditioning system to offset the difference between the desired temperature in a space and the actual temperature the space attains after the conditioning system turns off.

SUMMARY OF THE INVENTION

An object of the present invention is to provide a control for a space conditioning system that will adjust the sensed temperature of a space during operation to prevent temperature swings beyond the setpoint of the space.

In accordance with an aspect of the present invention, these and other objects are attained with an active anticipator that will offset the current sensor temperature for a space to reduce temperature swings in the space, based on the previous sensor temperature of the space after the space conditioning unit is turned off. The calculation of this offset of the current space temperature is based on the difference between the setpoint temperature and the previous actual measured maximum space temperature. This calculated value is then used to adjust the space temperature during the next operation of the space conditioning unit.

The various features of novelty which characterize the invention are pointed out with particularity in the claims annexed to and forming a part of this specification. For a better understanding of the invention, its operating advantages and specific objects are attained by its use, reference should be had to the accompanying drawings and descriptive matter in which there is illustrated and described a preferred embodiment of the invention.

BRIEF DESCRIPTION OF THE DRAWINGS

Other objects and advantages of the present invention will be apparent from the following detailed description in conjunction with the accompanying drawings, forming a part of this specification, and in which reference numerals shown in the drawings designate like or corresponding parts throughout the same, and in which.

DESCRIPTION OF THE PREFERRED EMBODIMENT

Figure 1:
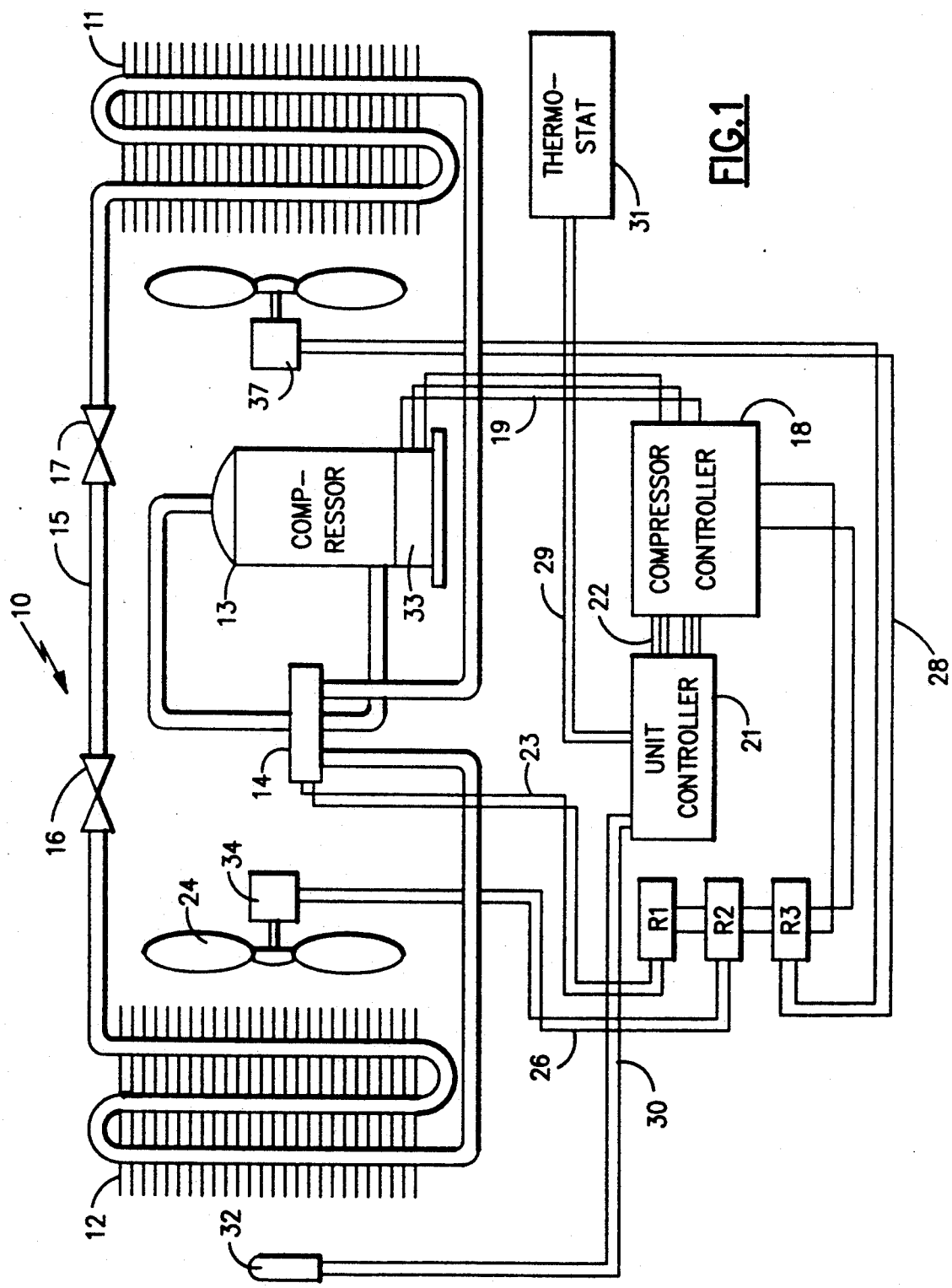
FIG. 1 is a schematic illustration of a heat pump system having the present invention incorporated therein.

Referring now to FIG. 1, there is shown a space conditioning system, such as a heat pump system 10, comprising an indoor coil 11, and outdoor coil 12, a compressor 13 and a reversing valve 14. Installed in the line 15 between the indoor and outdoor coils 11 and 12, are bi-flow expansion valves 16 and 17, each having provisions for bypassing refrigerant when it is not acting as an expansion device, thus allowing refrigerant to flow in either direction through the expansion valves depending upon the heating or cooling mode. All of these components operate in rather conventional heat pump manner to provide cooling to the indoor space while operating in the air conditioning mode and heating to the indoor space while operating in a heating mode.

Although the present invention is equally applicable to either constant speed or variable speed system, it will presently be described with reference to a constant speed system. The motor 33 drives the compressor 13, which is normally located in the outdoor section near the outdoor coil 12, the motor 37 drives the fan 27 for the indoor coil 11, and the motor 34 drives the outdoor fan 24 for outdoor coil 12. A compressor controller 18 is therefore provided to communicate with and to coordinate the operation of the reversing valve, compressor and the associated equipment.

The controller 18 is electrically connected to the compressor motor 33 by leads 19 and to a unit controller 21, which may be a microprocessor, by leads 22. The unit controller is, in turn, connected to reversing valve 14 by a way of relay R1 and leads 23; the outdoor coil fan motor 34 by way of relay R2 and leads 26; and to the indoor coil fan motor 37 by way of relay R3 and leads 28. In addition, the unit controller 21 is electrically connected to an outdoor coil thermistor 31 by way of leads 29 and indoor thermostat 32, which includes an indoor temperature sensor or thermistor, by way of leads 30. Further, the unit controller 21 calculates the offset of the space temperature for use in adjusting subsequent space sensor temperature.

The present invention is intended to optimize the efficiency of a space conditioning system by terminating the operation of the conditioning unit in accordance with an adjustable space temperature function to thereby prevent overshoot or undershoot of the space temperature. In doing so, the operational parameters that are measured are the desired setpoint of the space to be conditioned and the actual temperature of the space to be conditioned. These parameters are used to provide an anticipator space temperature value to be used during the next operation of the space conditioning unit to determine whether the unit should turn off sooner or later than the previous time so that there is less overshoot or undershoot.

During the heating and cooling mode the anticipator will use the following equation:

$$T_a = T_r + N K_f (1 - K_{exp})$$

Where:

$T_a$ is the anticipated space temperature (°F),
$T_r$ is the current space temperature (°F),
$K_i$ is the anticipator range constant,
N is the mode constant set to +1 for heating and −1 for cooling, and
$K_{exp}$ is an exponential growth constant determined by the following equation:

$$K_{exp}(new) = K_{exp}(old) \, (K_t)$$

Where:

$K_{exp}(new)$ is the new growth constant,
$K_{exp}(old)$ is the previous growth constant, and
$K_t$ is the time constant value set to 0.9.

At the beginning of each "On" cycle, $K_{exp}(old)$ and $K_{exp}(new)$ is equated to $K_t$, and $K_{exp}(new)$ is calculated every 60 seconds after the beginning of each "ON" cycle.

The unit controller shall monitor space temperature during the period starting when the conditioning unit cycles off until the unit cycles on. Immediately before the compressor turns on, the anticipator range constant ($K_i$) is adjusted responding upon the maximum differential between the sensed room temperature after the unit cycles off and the desired setpoint.

If the maximum differential between sensed space temperature after the conditioning unit turns off and the desired setpoint is greater than 0.25° F., then the control undershot or overshot, depending upon whether in the heating or cooling mode, and the range constant ($K_i$) is decremented by 0.125.

If the maximum differential between sensed space temperature after the conditioning unit turns off and the desired setpoint is less than or equal to 0.0° F., then the range constant is incremented by 0.125.

If the maximum differential between sensed space temperature after the conditioning unit turns off and the desired setpoint is greater than 0.25° F. but less than 0.0° F., then the range constant is unchanged.

Both heating and cooling gain constants ($K_i$) are initialized at 1.0 degrees at power up. They will not be allowed to exceed the range of 0° to 3.0° F.

Figure 2A:
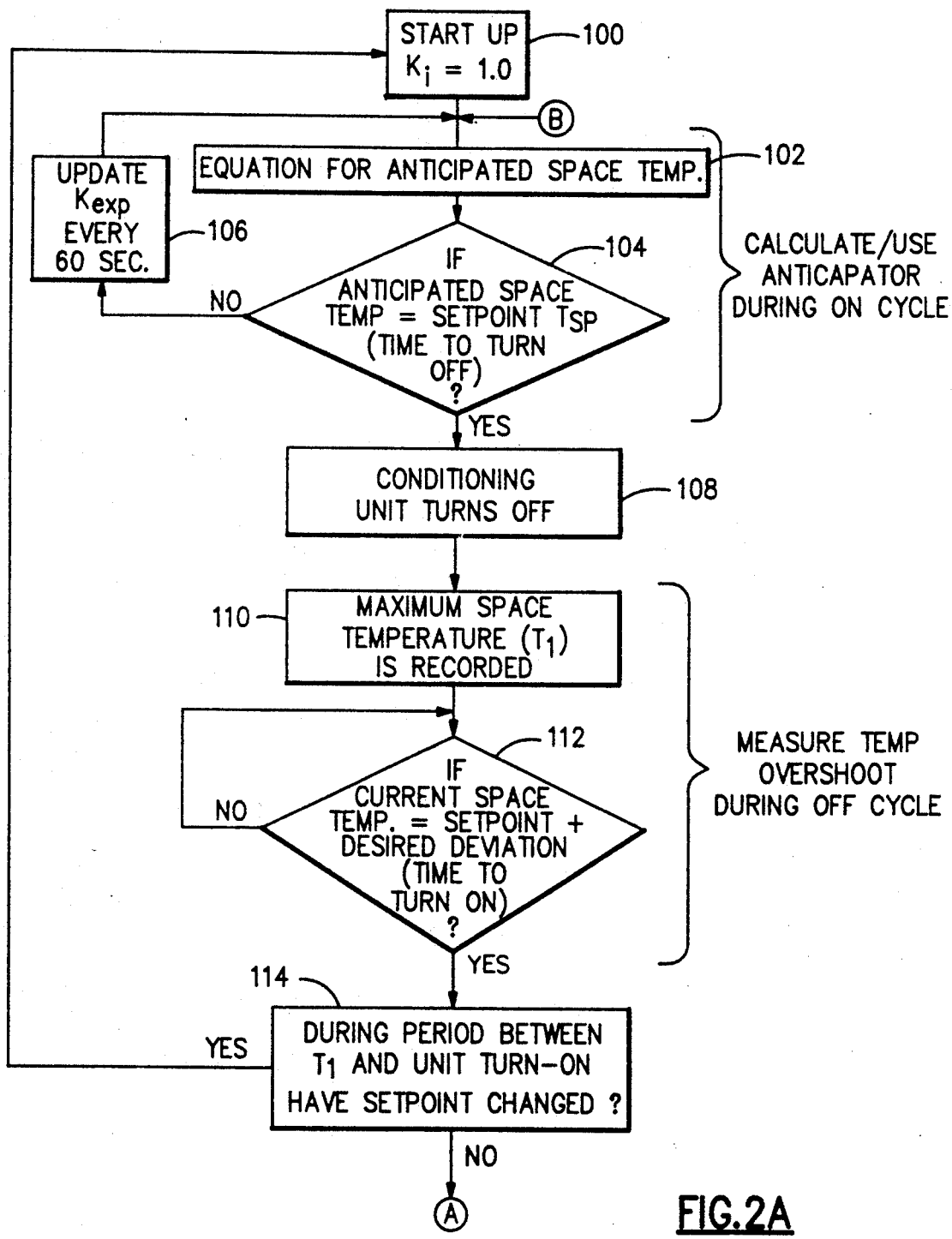
FIGS. 2, 2A and 2B are flow diagrams showing the sequence of steps to be performed in carrying out the adjustment of the sensor temperature for the anticipatory temperature of the present invention.
Figures 2, 2B:
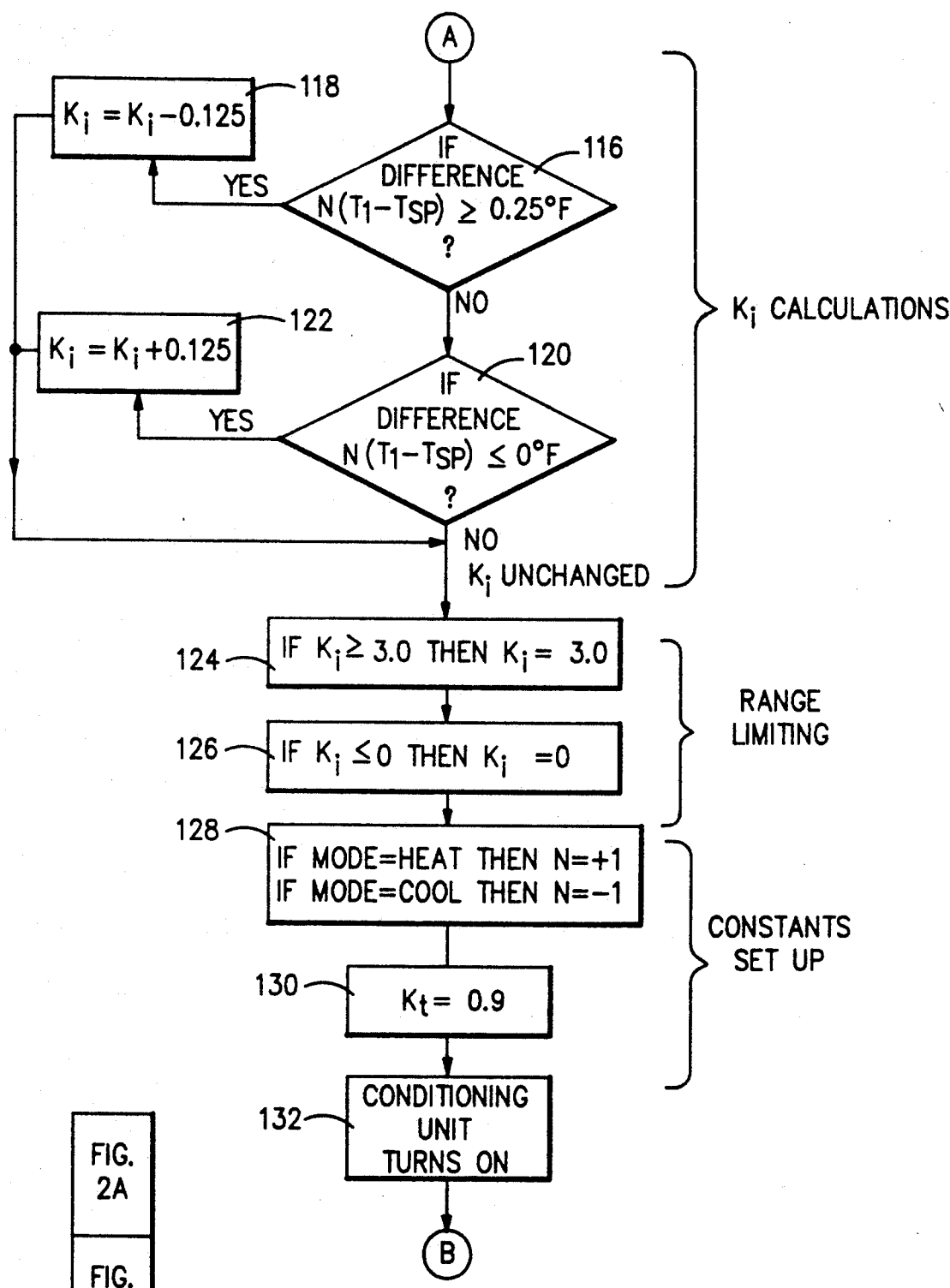

FIG. 2, 2A and 2B shows the flow chart of the logic used to determine the adjustment to the space temperature at which the conditioning unit will cycle off in accordance with the present invention, which in turn reduces space temperature overshoot and undershoot. It can be seen that the overall system control is obtained by logic flow through a series of logic steps. Each logic step may represent a subroutine or series of steps omitted for clarity in this overall chart. In this flow chart, diamond shaped boxes represent program inquires that lead to program instructions shown in rectangular boxes.

The flow chart includes initial step 100, which is the start of the space conditioning unit, from which the logic flows to steps 102, 104 and 106 to determine and use the anticipated Turn-Off temperature of the space. If the answer in step 104 is YES, the logic proceeds to step 108 to cycle off the space conditioning unit. However, if the answer in step 104 is NO the logic proceeds to step 106 which, if 60 seconds has elapsed since the space conditioning unit was energized, updates $K_{exp}(new)$ and continues to update $K_{exp}(new)$ every 60 seconds thereafter until the space conditioning unit turns OFF. After the space conditioning unit is deenergized in step 108, the space temperature is monitored and the maximum space temperature is recorded in step 110. The maximum space temperature attained after the space conditioning unit is deenergized is a function of the actual space temperature at which the unit was deenergized and the latent heating or cooling in the unit, and the temperature sensor lag. After the unit is deenergized the space setpoint is satisfied until the actual space temperature again deviates from the setpoint by a desired value, e.g. 2 of, as set forth in step 112. If the answer to step 112 is YES, the logic flows to step 114 to determine if the desired setpoint has been changed since the last deenergization of the conditioning unit. If the answer to step 114 is YES then the logic flows to step 100 where the space temperature adjustment is cancelled and the system is again initialized. However, if the answer to step 114 is NO the logic flows to (FIG. 2B) step 116, 118, 120 and 122 to calculate the anticipator range constant $K_i$ (°F).

If the difference between the maximum space temperature ($T_1$) and the desired setpoint ($T_{sp}$) when multiplied by the mode constant (N) is greater than 0.25° F. in step 116, then the anticipator range constant ($K_i$) is decremented by 0.125° F., in step 118, in order that the conditioning unit will be deenergized sooner during the next operating cycle, and if the difference between $T_1$ and $T_{sp}$ when multiplied by N is less than or equal to 0° F., in step 120, then $K_i$ is incremented by 0.125° F., in step 122, since the space temperature at which the unit deenergized undershot the desired setpoint. Steps 124, 126, 128 and 130 limit the range of $K_i$, and set the constants N and $K_i$. If the space conditioning unit turns "ON" in step 132 the logic flows to step 102 until the desired setpoint is again satisfied by the conditioning unit.

It can be seen that this control is especially useful in determining at what space temperature a conditioning unit should be deenergized in order to prevent space temperature undershoot and overshoot from a desired setpoint.

While the invention has been described herein with reference to a preferred embodiment, it is to be understood that variations and modifications can be effected by those skilled in the art.

We claim:

1. A control device for controlling a space temperature modifying apparatus comprising:
   means for measuring an ambient space temperature;
   means for setting a desired temperature setpoint to be maintained in a space by said space temperature modifying apparatus; and
   means, connected to said measuring means and said setpoint setting means, for calculating a next subsequent space temperature at which said space temperature modifying apparatus is deenergized upon comparison between a maximum space temperature attained after a previous deenergization of said space temperature modifying apparatus and the desired temperature setpoint, to maintain the desired temperature setpoint;
   where said calculation means calculates an anticipated space temperature at which said space temperature modifying apparatus is deenergized to maintain the desired temperature setpoint according to the relationship $$T_a = T_r + N \, K_i (1 - K_{exp})$$

in which relationship $T_a$ is the anticipated space temperature, $T_r$ is the current space temperature, $K_i$ is an anticipator range constant, N is a mode constant set to $+1$ for heating and $-1$ for cooling and $K_{exp}$ is an exponential growth constant.

2. The control device of claim 1 in which the exponential growth constant $K_{exp}$ is calculated according to the relationship $$K_{exp}(new) = K_{exp}(old) \times K_t,$$

where
$K_{exp}(new)$ is a new growth constant,
$K_{exp}(old)$ is the previous growth constant, and
$K_t$ is a time constant value set to 0.9.

3. The control device of claim 2 in which the next subsequent anticipator range constant ($K_i$) is decreased by 0.125° F. if the difference between the previous maximum space temperature attained after the space temperature modifying apparatus is deenergized and the desired temperature setpoint, when multiplied by the mode constant (N), is equal to or greater than 0.25° F.

4. The control device of claim 2 in which the next subsequent anticipator range constant ($K_i$) is increased by 0.125° F. if the difference between the previous maximum space temperature attained after the space temperature modifying apparatus is deenergized and the desired temperature setpoint, when multiplied by the mode constant (N), is less than or equal to 0.0° F.

* * * * *